June 3, 1930.  R. C. JONES  1,760,907
BOW TUBE FILM TYPE EVAPORATOR
Filed June 26, 1923   2 Sheets-Sheet 2
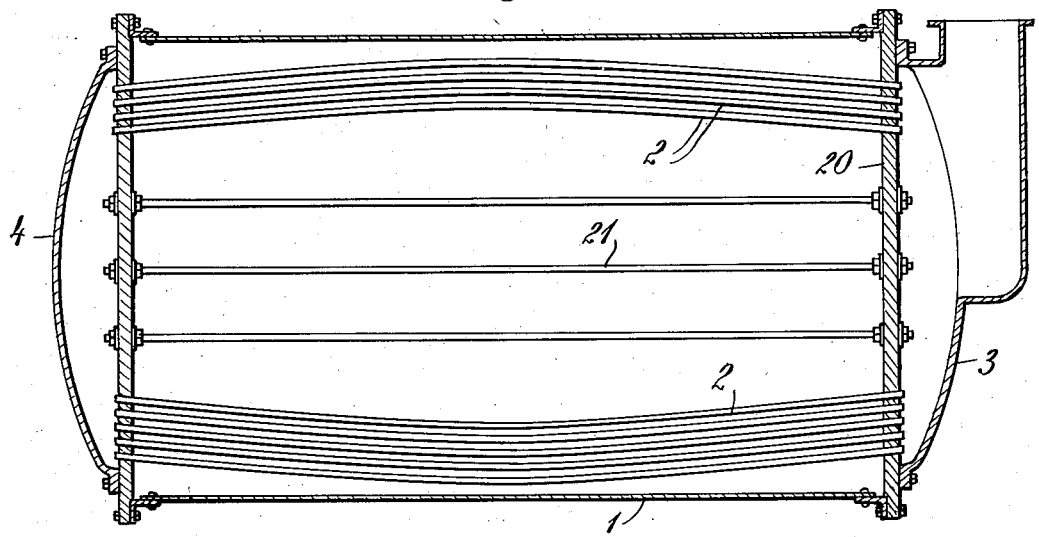
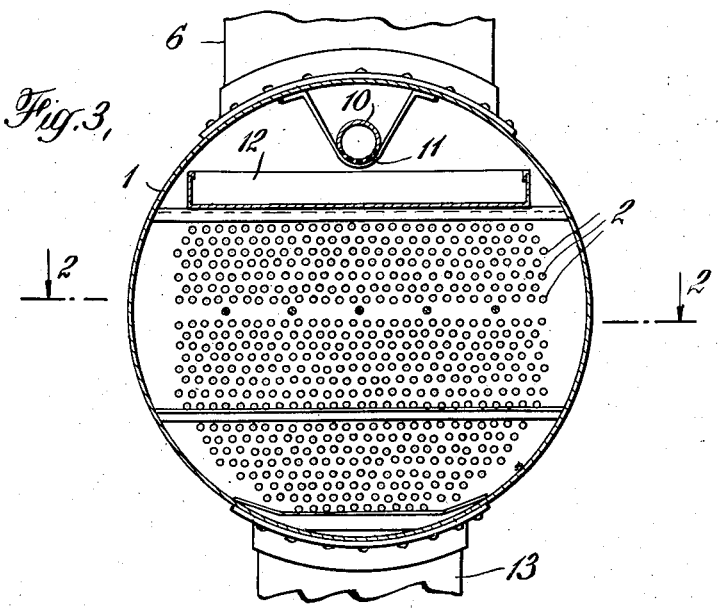
INVENTOR
Russell C. Jones
BY
Pennie, Davis, Marvin & Edmonds
ATTORNEYS Patented June 3, 1930

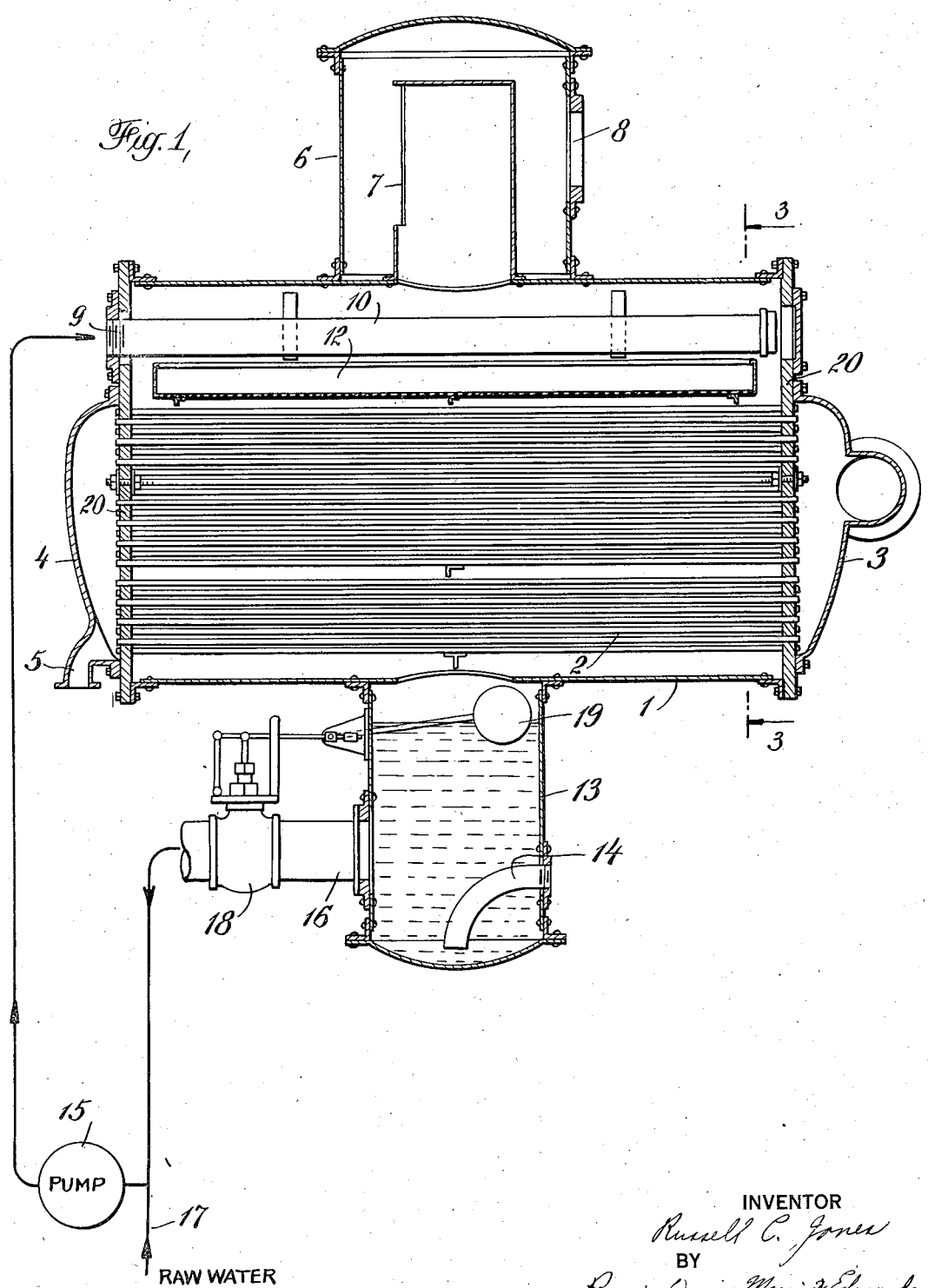

1,760,907

UNITED STATES PATENT OFFICE

RUSSELL C. JONES, OF BRONXVILLE, NEW YORK, ASSIGNOR TO THE GRISCOM RUSSELL COMPANY, OF NEW YORK, N. Y., A CORPORATION OF DELAWARE

BOW-TUBE FILM-TYPE EVAPORATOR

Application filed June 26, 1923. Serial No. 647,939.

The present invention relates to an evaporator of the so-called film type for furnishing purified boiler feed water and has to do particularly with the distribution of liquid over the heating element of the evaporator and with the control and removal of scale deposits.

Evaporators as frequently constructed and used in steam plants consist of a shell for containing the liquid to be evaporated and a heating element within the shell at least partly submerged in the liquid. Steam from a suitable source is supplied to the heating element and in this manner a continual ebullition of the liquid with consequent vaporization is effected. This type of evaporator is probably the type which is best known and most widely used at the present time. There have however been proposed other types of evaporators and notably the film type evaporator has proven successful in industrial applications and exhibits well defined advantages under certain conditions of operation. In evaporators of the film type the impure liquid is caused to flow over the heating surfaces in a film or layer, and the vaporization of the liquid occurs while it is thus flowing along or adhering to the heating surfaces in the form of a film. This method of vaporization is in contrast to that occurring in the type of evaporator above mentioned wherein the heating coils are actually submerged or partly submerged in the body of liquid in the shell. In the film type evaporator where the heating element consists of a plurality of heat transferring tubes the steam is commonly passed through the tubes and the water distributed about the exterior of the tubes. The intent is to bring the heating medium into contact with the tube surface to thereby supply the heat required for evaporation, and at the same time to distribute the impure liquid in an even film or layer upon the opposite side of the tube surface so that it will directly receive the heat transferred through the metallic walls of the tubes.

Since the evaporation in the film type evaporator occurs while the liquid being evaporated is distributed in a relatively thin film upon the heat transferring surfaces portions of these surfaces frequently become dry. For instance, if the distribution of the film of liquid over the heat transferring surface is not uniform portions of the surface where the film of liquid is deficient are apt to dry. This of course not only decreases the operating efficiency of the unit due to the fact that not all of the heat transferring surface is engaged in evaporating the liquid but also serves to increase the scale deposit on the heating surface and to render these deposits extremely hard. During normal operation of the device all of the heat transferring surface will be covered with liquid and as portions of the liquid are vaporized the remaining film of liquid becomes more concentrated, but nevertheless most of the impurities pass on and flow off the heat transferring surface in dissolved condition from whence they may be discharged from the evaporator. However, if a portion of the surface over which this concentrated liquid is flowing should become dry the contained impurities will of course precipitate out and will accumulate upon the heating surface, thus quickly forming an unduly heavy scale deposit which is extremely hard, and difficult to remove.

As a part of my invention I provide at all times for a thorough distribution of the liquid over the heating surface and I arrange for an ample quantity of liquid to be supplied to the heating surface to thereby minimize the danger of a portion of the surface becoming dry during the operation of the apparatus. I employ as heating medium a tube bundle consisting of a large number of tubes arranged in substantial parallelism and having their ends expanded or otherwise securely fastened into suitable tube sheets. Heating steam is passed through the tubes and the liquid to be evaporated is distributed over the outside of the tubes. The liquid to be evaporated is admitted to the apparatus above the tube bundle and is there caused to flow out to cover the entire area above the tube bundle, after which it is admitted directly on to the tubes in such fashion that the entire exterior surface of each of the heat transferring tubes receives a film of liquid. To prevent portions of the tube surface from becoming dry during operation an excess of liquid is supplied to the tubes. This is accomplished by providing for recirculation, that is by running the liquid over the tubes repeatedly until the liquid is evaporated down to the desired concentration. The liquid is, of course, continually evaporating and to insure an ample supply to the tube bundle, I introduce into the recirculation line a certain amount of fresh liquid and regulate the quantity of said liquid introduced according to the rate at which the liquid is being vaporized. I provide for the automatic control of the quantity of liquid admitted so that it will at all times be equal to the quantity of liquid which is being evaporated. This arrangement serves to keep the evaporator in operation at its best efficiency and at the same time to minimize the amount of scale deposit and render the character of the scale softer.

In addition to minimizing and softening the scale deposit and thus rendering it less difficult to remove, it is a further object of the invention to provide for a ready and effective exfoliation of whatever scale deposits do occur. To this end I provide heating tubes of such nature that the surface can be warped or flexed, and in this fashion cracking off of the accumulated layer of relatively brittle scale occurs. A straight tube of circular cross section will exert a certain cracking action on the scale due to the fact that the temperature coefficient of the scale deposit and of the metal of the tube are different so that during changes in temperature the unequal expansion and contraction of the tube and the scale deposit will tend to loosen the scale. This cracking action is, however, not sufficient to effect satisfactory removal of the scale. To increase this cracking effect I initially deform the tube into such shape that it will change its form upon change in temperature and will thus exert a continual cracking action due to the temperature variations occurring during operation of the apparatus, and at the same time will permit of complete removal of the scale by subjecting the tube to an abrupt change in temperature such as, for instance, by successively introducing hot and cold water into the tube. By limiting the amount of scale deposit in the manner above described, and at the same time providing for a continual cracking off action to be exerted upon the scale deposit which tends to form, I am able to provide an evaporator which may be kept in substantially continuous operation over a long period of time. Furthermore, when it does become necessary to discontinue operation and remove the scale, this task may be accomplished in a short time by merely introducing successively into the tube bundle quantities of hot and cold water, or steam and cold water. The expansion and contraction produced by this treatment will cause the tube surface to flex and the layer of deposited scale will be loosened and cracked off and there will be no necessity of removing the scale manually, as is frequently necessary in evaporators now on the market.

I have illustrated a preferred embodiment of my invention in the accompanying drawings, in which Fig. 1 is a vertical sectional view taken centrally through an evaporator embodying my invention.

Fig. 2 is a horizontal sectional view showing the conformation of the heating tubes, and Fig. 3 is a transverse sectional view through the apparatus.

The evaporator consists primarily of a containing shell 1 and a tube bundle 2 positioned within the shell and designed to receive steam as its heating medium. Steam is admitted through the inlet opening and chamber 3 and after being condensed in its passage through the tubes 2 is admitted into the discharge chamber 4 and passed out through the opening 5 provided for the purpose. Above the tube bundle 2 is a vapor space or dome 6 containing a separator 7 which serves to separate out from the vapor particles of liquid which have become entrained in it and to then permit the vapor to pass out through the opening 8.

The liquid to be evaporated is admitted at 9 into a tube 10 extending longitudinally of the apparatus above the tube bundle. The lower portion of the tube 10 is perforated, as indicated at 11 in Fig. 3, and this permits the incoming water to spray out upon a distributing plate 12. This distributing plate is mounted above the tube bundle and extends over an area substantially coextensive with the sectional area of the tube bundle. The distributing plate 12 has a perforated bottom and serves to admit liquid upon the tube bundle in the form of a spray which descends rapidly upon all the tubes of the bundle and insures that the surface of each tube is provided with its requisite film of liquid. It will be understood that the water on the distributing plate 12 is maintained at a desired depth so that there is at all times an ample quantity of liquid being supplied to the heat transferring surface. Likewise, since the distributing plate extends over the entire tube bundle an effective and thorough distribution of the liquid is secured.

The liquid passing into the bottom of the shell is collected in a chamber 13 provided for the purpose and having a blow down outlet 14 for removal of the concentrated discharge. Inasmuch as an excess of liquid is at all times passed over the tube bundle recirculation of the water traversing the evaporator shell is provided. A pump 15 is in connection with discharge outlet 16 of the collection chamber and by pumping the liquid from this chamber into the distributing pipe 10 it effects the necessary recirculation. To compensate for the liquid which is evaporated fresh liquid from a suitable line 17 is introduced into the apparatus by the pump 15 along with the liquid from the collection chamber. Since the distributing plate 12 is covered at all times with the liquid and the evaporating surfaces thus kept in operation at maximum efficiency, the quantity of liquid passed to the collection chamber 13 depends directly on the rate of evaporation in the apparatus. That is, with a high rate of evaporation, such as, for instance, is the case where the amount of heating steam is for one reason or another increased, the quantity of liquid passed to the collection chamber will decrease and the level of the liquid in this chamber will also tend to fall. I provide, however, for maintaining a substantially constant liquid level in the collection chamber 13. This is accomplished by reason of float controlled valve 18 in the discharge line leading from the collection chamber. When the level within the chamber tends to fall the float will serve to close the valve 18 a certain amount and this decreases the quantity of liquid withdrawn from the chamber. Since this pump 15 delivers at all times a substantially constant quantity of liquid the decrease in the amount of liquid drawn from the collection chamber will be compensated for by an additional quantity of fresh liquid from line 17 so that the quantity of liquid distributed over the tubes of the heating element will at all times be ample. By thus keeping the entire heating surface of the tube bundle covered with a film of liquid a maximum rate of evaporation is insured.

The tubes 2 of the bundle are deformed so that they will flex materially upon abrupt temperature change. For instance, the cross section of the tubes may be distorted from a true circular shape so that upon expansion or contraction a change in cross-sectional conformation will occur. I, prefer, however, to employ a tube of circular cross section but slightly bowed so that the middle portion of each tube is displaced to a slight extent out of a straight line connecting its ends. The ends of the tube are fixedly suported in tube sheets 20, which tube sheets are rigidly attached to the apparatus shell and are thus held against relative movement under the influence of stresses put upon them by changing temperature of the tubes. Thus, if the temperature of the tubes be abruptly raised, such as for instance by introducing hot water into the tubes, the longitudinal expansion of the tubes under the influence of the temperature change will accentuate the bow and flex the surface of the tube along its entire length to thus crack off the accumulated scale. We have found that a change of bowing in the tube of about two inches measured perpendicularly to the straight line connecting the ends of the tubes may be produced in this manner upon a length of tubing of about ten feet. This amount of flexure is ample to effect thorough exfoliation of the accumulated scale deposit. Similarly, during normal operation of the apparatus temperature changes of greater or lesser magnitude will constantly occur, and these changes are always accompanied by a certain flexure of the tubing with the result that a continual cracking action is exerted on the scale deposit.

I have illustrated and described a preferred embodiment of my invention, but certain changes and modifications may be made within the full scope of the appended claims.

I claim:

1. Apparatus for treating liquids involving the deposit of scale-forming materials comprising a shell, heating tubes within said shell, distributing means positioned above said heating tubes and substantially coextensive therewith for distributing the incoming liquid above the heating tubes and passing it down upon said tubes, whereby the liquid will cover the tube surfaces in a thin film, rigidly spaced tube sheets wherein the ends of the heating tubes are fixedly supported, said tubes having a curvature which varies in magnitude with changes in temperature and thereby fiexes the tube surfaces causing exfoliation of accumulated scale, and means for recirculating the liquid which passes the heating tubes unevaporated.

2. An evaporator for producing purified vapor from water containing scale-forming impurities, comprising a shell, heating tubes within the shell, an inlet for incoming water comprising a tube extending above said heating element in substantial parallelism therewith and being perforated along its bottom portion for discharge of the liquid, a distributing plate above said heating tubes and substantially coextensive therewith for receiving the liquid from said perforated tube and passing it down upon said heating tubes, whereby the liquid will cover the tube surfaces in a thin film, rigidly spaced tube sheets wherein the ends of the heating tubes are fixedly supported, said tubes having a curvature which varies in magnitude with changes in temperature and thereby flexes the tube surfaces causing exfoliation of accumulated scale, and means for recirculating the liquid which passes the heating tubes unevaporated.

3. An evaporator for producing purified vapor from liquid containing scale-forming impurities comprising a shell for containing the liquid to be evaporated, a bundle of heat transferring tubes within the shell each bowed sufficiently to prevent rupture under the influence of expansion but not sufficiently to prevent a substantial exfoliation of the scaly deposit of impurities on said tubes by bending or straightening of the tubes under expansion or contraction, tube sheets for supporting said tubes at their respective ends, means for rigidly spacing said tube sheets a fixed distance apart, means for distributing incoming liquid onto the surfaces of said tubes in relatively thin films producing a non-uniform and continuously varying temperature of the surfaces of the tubes throughout said tube bundle whereby a continuous flexing of said tubes and consequent scale removing action is produced during the normal operation of said evaporator, and means for recirculating the liquid which passes the tubes unevaporated.

4. In an evaporator for producing purified vapor from liquid containing scale-forming impurities, having a shell, an inlet for liquid to be treated in the top of the shell, and means for recirculating liquid from the bottom to the top of said shell, the combination of heating tubes within said shell bowed somewhat from a straight line passing through their ends, tube sheets mounted in rigidly spaced relation so that said tubes will bend or straighten to a greater or less extent under the influence of expansion or contraction, and means for receiving the liquid entering the shell at the top and distributing the same onto the surfaces of said tubes in the form of relatively thin films.

5. Apparatus for treating liquids involving the deposit of scale-forming substances from the liquid comprising a shell, heating tubes within said shell, means for bringing on to the tube surfaces a supply of liquid in finely divided form so that said liquid is evaporated by contact of the finely divided liquid with the hot surface of the tubes, said tubes having their central portions offset laterally and having their ends rigidly secured against relative longitudinal movement so that said tubes will move laterally to a greater or less extent with changes in temperature, means for collecting unvaporized liquid at a point below said tubes, means for removing said liquid, and means for withdrawing vapor from the shell.

In testimony whereof I affix my signature.

RUSSELL C. JONES.